United States Patent [19]
Oltman et al.

[11] Patent Number: 5,451,473
[45] Date of Patent: Sep. 19, 1995

[54] LONG LIFE METAL-AIR (BATTERY AND BUTTON CELLS THEREFOR) CELL HAVING INCREASED CURRENT PULSE CAPABILITY

[75] Inventors: John Oltman, Mt. Horeb; Robert Dopp, Madison, both of Wis.

[73] Assignee: Rayovac Corporation, Madison, Wis.

[21] Appl. No.: 162,927

[22] Filed: Dec. 8, 1993

Related U.S. Application Data

[63] Continuation-in-part of Ser. No. 826,736, Jan. 28, 1992, abandoned.

[51] Int. Cl.$^6$ ............................................. H01M 12/06
[52] U.S. Cl. ............................................. 429/27; 429/3
[58] Field of Search ............... 429/27, 159, 162, 3

[56] References Cited

U.S. PATENT DOCUMENTS

| | | | |
|---|---|---|---|
| 4,054,726 | 10/1977 | Sauer | 429/77 X |
| 4,262,062 | 4/1981 | Zatsky | 429/27 |
| 4,620,111 | 10/1986 | McArthur et al. | 429/27 X |
| 4,640,874 | 2/1987 | Kelm | 429/27 |

*Primary Examiner*—Anthony Skapars
*Attorney, Agent, or Firm*—Thomas F. Woods

[57] ABSTRACT

A metal-air cell is disclosed that provides high currents on an intermittent basis to electrical loads connected thereto. In one embodiment of the present invention, a restrictive membrane is effectively supported by the bottom of the cathode can, and is separated from an air cathode assembly disposed within the cell by an air reservoir. The air reservoir provides sufficient oxygen to the air cathode assembly during periods of high current drain upon the cell. Upon returning to low drain conditions, the air reservoir is gradually replenished by air flowing through the restrictive membrane at a controlled rate.

24 Claims, 5 Drawing Sheets

LONG LIFE METAL-AIR (BATTERY AND BUTTON CELLS THEREFOR) CELL HAVING INCREASED CURRENT PULSE CAPABILITY

This application is a continuation-in-part of Ser. No. 07/826,736, filed Jan. 28, 1992 now abandoned.

FIELD OF THE INVENTION

This invention relates to a long life metal-air cell having increased current pulse capability provided by a novel air reservoir structure disposed therewithin. This invention also relates to a novel battery particularly adapted for low current computer back-up power applications, such as to provide back-up power to computer real time clocks and computer configuration retention memories. In this embodiment the battery has a plurality of metal-air cells capable of providing adequate voltage at low rate discharge over extended periods of time, but which also provide significantly increased pulse currents relative to metal-air cells of the prior art.

BACKGROUND OF THE INVENTION

The advent of portable computers has significantly increased the demand for safe, small sized long active-life batteries, having flat discharge curves at adequate voltage levels. While the demand for more functions has increased power requirements, the size of portable computers is ever decreasing, thereby requiring batteries to have increased energy and power densities.

Two types of batteries are used in personal computers. The first type provides primary power for the entire computer and the second type provides a back-up power source for the real time clock and other functions. In desktop computers, the back-up power source is required only for the real time clock and configuration memory retention, while in portable computers back-up power is additionally required for microprocessor suspend functions which increase energy drain rates. Consequently, since the increase in energy drain rates on an intermittent basis. As a result, back-up power sources in portable computers must be capable of providing more power on an intermittent basis than their desktop computer counterparts.

At first impression nickel-cadmium rechargeable batteries might appear to be suitable for providing back-up power in portable computers. However, sporadic use of portable computers often yields insufficient charge time for nickel-cadmium batteries, resulting in an increase incidence of data loss and battery failure. Additionally, nickel-cadmium batteries self discharge at a rate of 1% per day. Thus, such batteries may be totally discharged prior to purchase by the consumer. Moreover, cadmium is considered an environmental hazard rendering the disposal of nickel-cadmium batteries problematic.

Other battery systems are similarly inappropriate for use as back-up power sources. For example, lithium thionyl chloride batteries feature a low voltage, i.e., 3.6 Volts, close to the minimum voltage required to power most integrated circuits (hereinafter "IC" or "ICs"). Additionally, lithium thionyl chloride cells have been shown to be extremely dangerous in accidental abuse situations. Safer lithium chemistry cells such as lithium manganese dioxide button cells feature even lower voltages of 3.0 Volts or less, thus further limiting IC selection. Moreover, the relatively large size of such cells may cause problems when attempting to design low profile devices.

Another possible solution is to use metal-air cells, i.e., electrochemical cells wherein the oxygen in the air is the cathode material and a metallic material is the anode material. In many instances the preferred metal is zinc. In metal-air cells, air enters the cell through one or more pods in the cell which are either immediately adjacent to a cathode assembly, or separated from the cathode assembly by an air chamber. In either arrangement, the air diffuses into the cathode assembly where the oxygen in the air reacts with the water in the electrolyte consuming electrons and producing hydroxide ions. These ions then oxidize the metallic anode material producing one or more electrons for each atom of metal reacted. Such air cathode electrochemical cells are well known, and are more fully discussed in U.S. Pat. No. 4,591,539 (Oltman et al.). Moreover, metal-air cells am environmentally benign.

The cathode assembly also decreases the rate of diffusion of other gases into and out of the cell, particularly water vapor. The rate of oxygen ingress into the cathode to react with water and thereby produce hydroxide ions is the limiting factor to the rate of discharge of the cell. The moisture content inside the cell is balanced with the metal (e.g., zinc) content, for the most efficient use of this anode material. The gain or loss of too much moisture can reduce discharge efficiency.

Some prior ad metal-air cells provided an air chamber between the bottom side of the restrictive membrane and the interior surface of the bottom of the cathode can. See, e.g., U.S. Pat. No. 4,404,266 (Smilanich). Such prior art air chambers enable air to diffuse away from the air pods in the cathode can and react uniformly with the entire surface of the cathode assembly, instead of reacting disproportionately with those potions of the cathode assembly nearest to the air ports.

To limit water loss/gain between the cell and its immediate environment, some metal-air cells include a restrictive membrane between the exterior of the cell and the cathode layer. The restrictive membrane is usually located immediately adjacent to the cathode assembly. In other words, in prior art cells having an air chamber, the restrictive membrane is located between the air chamber and the air cathode assembly. Regardless of whether the cells provide an air chamber, the restrictive membrane limits moisture transport into and out of the cell. As noted above, the moisture content of the cell interior is one of the factors influencing cell efficiency.

A restrictive membrane limits not only the flow of moisture into and out of the cell, but also the flow of oxygen into the cell. Because oxygen is the cathodic material in metal-air cells, a reduction in oxygen ingress rate limits the rate capability of such cells. Because portable computers may require that the backup power source provide a pulse capability, prior art low rate metal-air cells have not been preferred for such applications.

However, due to their non-toxic chemistry, the relatively flat discharge curves they produce, and their long life, metal air batteries would be suitable candidates for back-up power sources in portable computers if, for example, oxygen ingress and water loss rates could be controlled to permit a high pulse capability.

Consequently, it is an object of the present invention to provide a battery having a long life under low discharge conditions.

Another object of the present invention is to provide a long-life battery having increased pulse capability.

Still another object of the present invention is to provide a long-life battery which produces a voltage greater than the IC effective minimum of three volts, yet has a significant pulse capability.

Yet another object of the present invention is to provide for a long-life battery that occupies a minimum amount of space.

It is another object of the present invention to provide a battery that does not present a hazard to the environment.

It is yet another object of the present invention to provide a battery suitable for low-discharge rate back-up power applications in computers.

Another object of the present invention is to provide a metal-air cell which controls air ingress such that the cell can provide pulse currents.

Still another object of the present invention is to provide metal-air cells which are substantially unaffected by changes in the ambient relative humidity.

These and other objects of the present invention, as will become more readily apparent hereinafter, are achieved by the invention described herein below.

SUMMARY OF THE INVENTION

The present invention provides for a battery which is particularly adapted for use as a back-up power source for portable computers. Such a battery can provide a back-up power source for real time clocks, configuration files and microprocessor suspend functions.

In one embodiment of the present invention, the battery comprises a plurality of novel metal-air button cells, each of which utilizes a restrictive membrane that permits oxygen to enter the cell at a rate greater than the minimum necessary to provide the current supplied by the cell during non-pulse use. The cells incorporated into the batteries of present invention utilize an air chamber provided on the interior side of the restrictive membrane. Thus, the restrictive membranes of the metal-air cells of the present invention are located between the cathode can and the air chamber, instead of between the air chamber and the air cathode assembly. That is, the restrictive membrane of the present invention forms the floor of the air chamber, instead of the ceiling.

In metal-air cells of the present invention, the air chamber fills with the air that enters the cell during non-pulse periods beyond the amount needed to supply the non-pulse current. Thus, at any point in time, there is a reservoir of air available inside the cell which can be used to supply a pulse current. Thus, the reservoir can provide cathodic material (oxygen) at a much greater rate than the ingress rate through the restrictive membrane. Because the oxygen ingress rate through the restrictive membrane is greater than the minimum necessary to supply the non-pulse current, the reservoir can be replenished with air after a pulse.

In a preferred embodiment of the present invention, the battery comprises three of the novel metal-air cells arranged in series. The housing of the battery is formed so as to allow sufficient air ingress to the metal air cells.

DETAILED DESCRIPTION OF THE INVENTION

Figure 1:
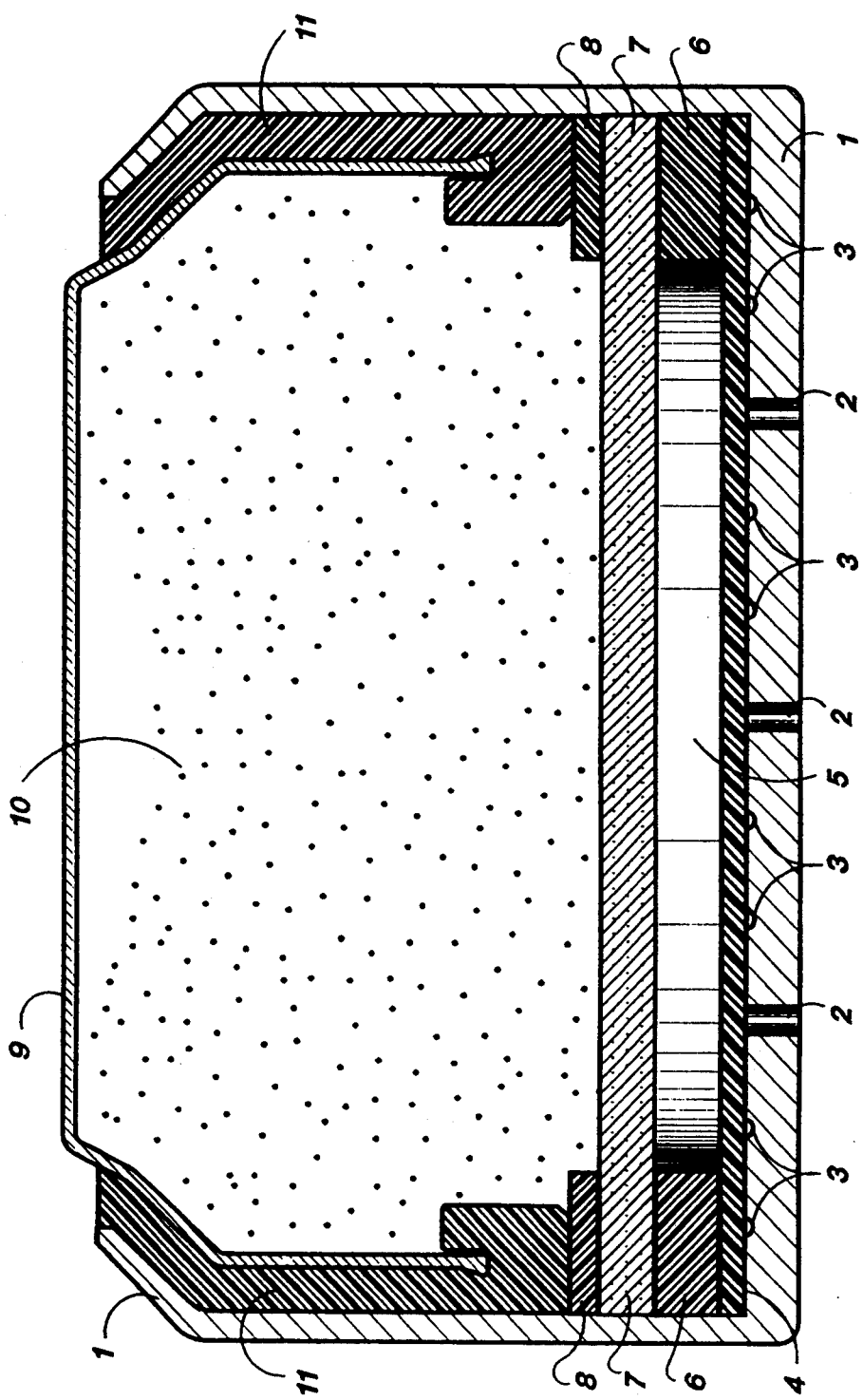
FIG. 1 is a cross-sectional view of one embodiment of a metal-air cell of the present invention, wherein an air reservoir is formed by the inclusion of a washer-shaped spacer.

A metal air cell of the present invention is shown in FIG. 1, and comprises a cathode can 1 having air entry ports 2, and diffusion grid 3 embossed on the interior surface of the bottom of the cathode can 1. A restrictive membrane 4, preferably formed of a layer of polytetrafluoroethylene (PTFE or Teflon ®) approximately 0.0005 inches thick, is disposed on the floor of the cathode can, and is effectively supported thereby. As shown in FIG. 1, the novel metal-air cell further provides an air reservoir 5 formed by a washer-shaped spacer 6. The spacer, preferably about 0.005 inches thick, has an outer diameter approximately equal to the inner diameter of the cathode can. The spacer is disposed on top of the restrictive membrane, and fits securely inside the cathode can. In 675-size cells, which are used in a preferred embodiment of the present invention, such an air reservoir has an effective volume of approximately 35 microliters. An air cathode 7 having a diameter equal to the outer diameter of the spacer is disposed above the spacer and has top and bottom major opposing surfaces. A seal ring 8 with an outer diameter approximately equalling to that of the spacer is disposed above the air cathode. An anode can 9, having anodic material 10 disposed therewithin, and preferably comprising gelled zinc particles, is inverted and its downwardly projecting sidewalls are disposed within the upwardly projecting sidewalls of the cathode can. A grommet 11, preferably of nylon and disposed between the inner surface of the upwardly projecting sidewalls of the cathode can and the outer surface of the downwardly projecting sidewalls of the anode can, is squeezed tightly between the two cans when the cathode can is crimped shut.

Figure 2:
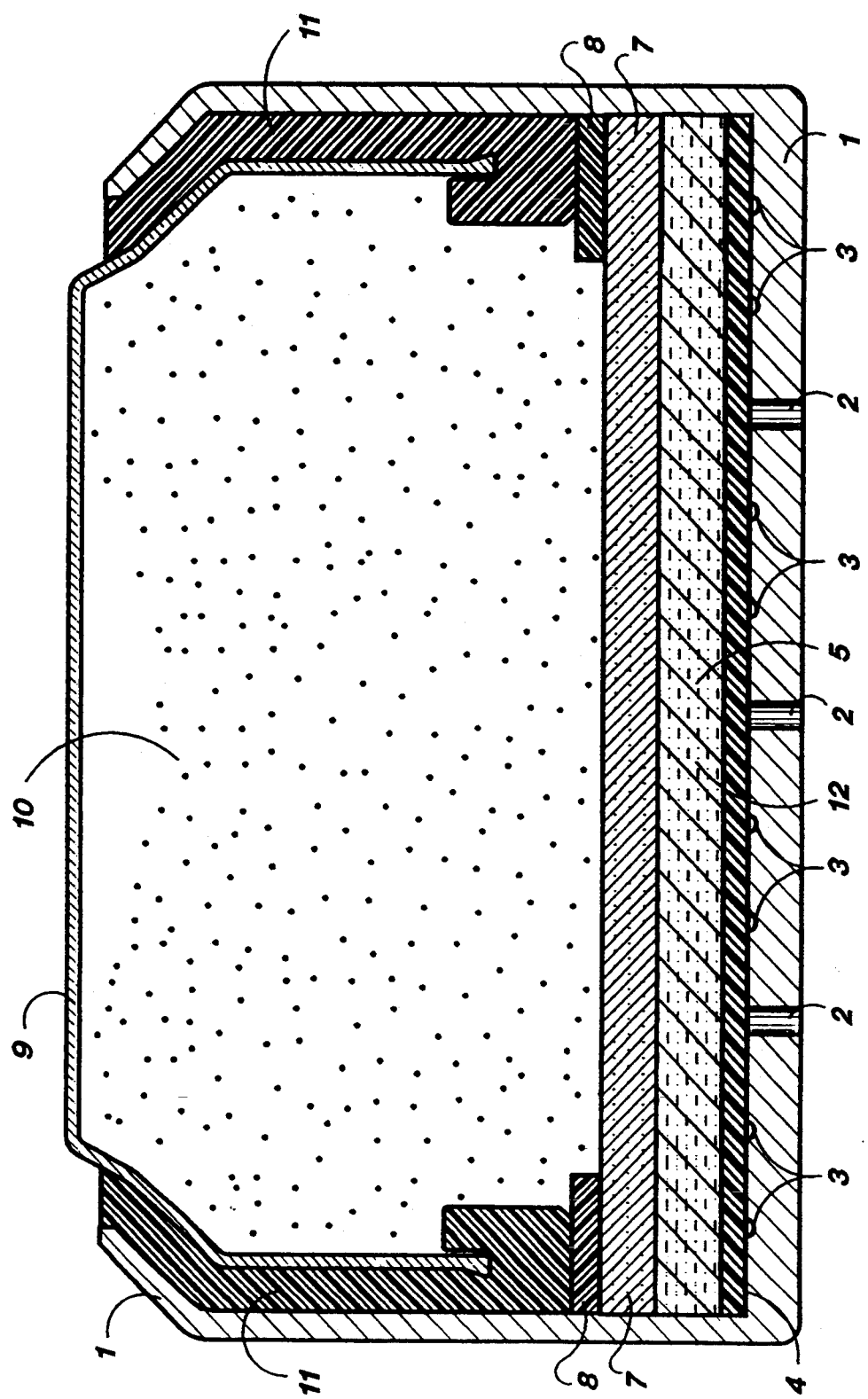
FIG. 2 is a cross-sectional view of another embodiment of a metal-air cell of the present invention, wherein an air reservoir is formed by the inclusion of a porous material.

FIG. 2 shows another embodiment of the novel metal-air cells incorporated into the present invention in which the air reservoir 5 is formed, instead of by the spacer 6, by providing a porous material 12 between the air cathode 7 and the restrictive membrane 4. The effective height of this reservoir is approximately 0.012 inches. Preferably, the porous material is an unsintered polytetrafluoroethylene/fluoroethylene propylene (FEP) material.

Figure 3:
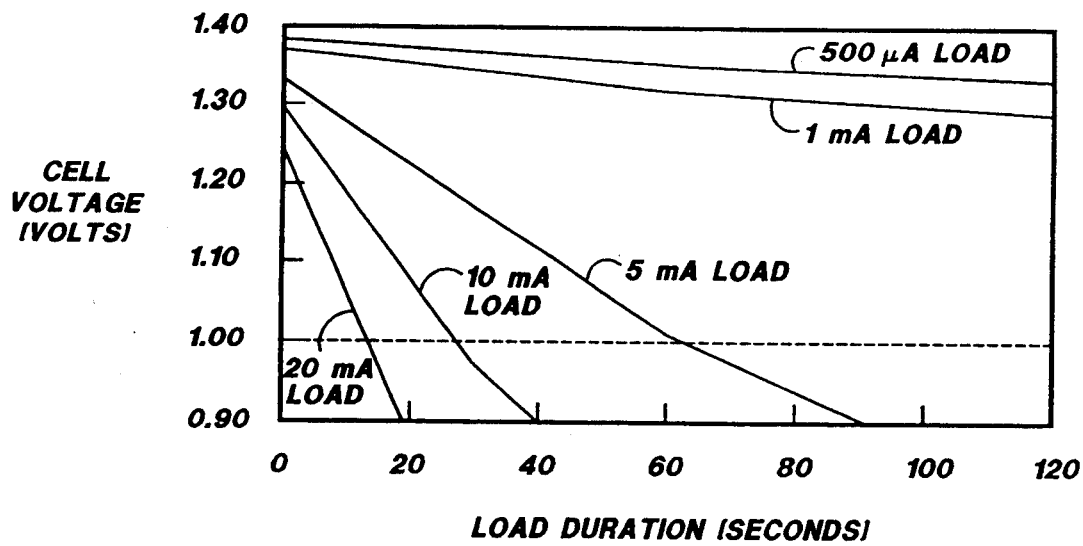
FIG. 3 shows changes in cell voltage of cells of the present invention on heavy loads as a function of the duration of the pulse.

To test pulse capability, metal air cells of the present invention were placed on several galvanic discharge loads, and the voltage was monitored. FIG. 3 shows the results of those tests, where the functional voltage end point is 1.0 Volts. FIG. 3 shows that metal air cells of the present invention can deliver sufficient current to maintain a steady-state load of about 100 $\mu$A. The pulse capability for 30 seconds is two decades greater.

Figure 4:
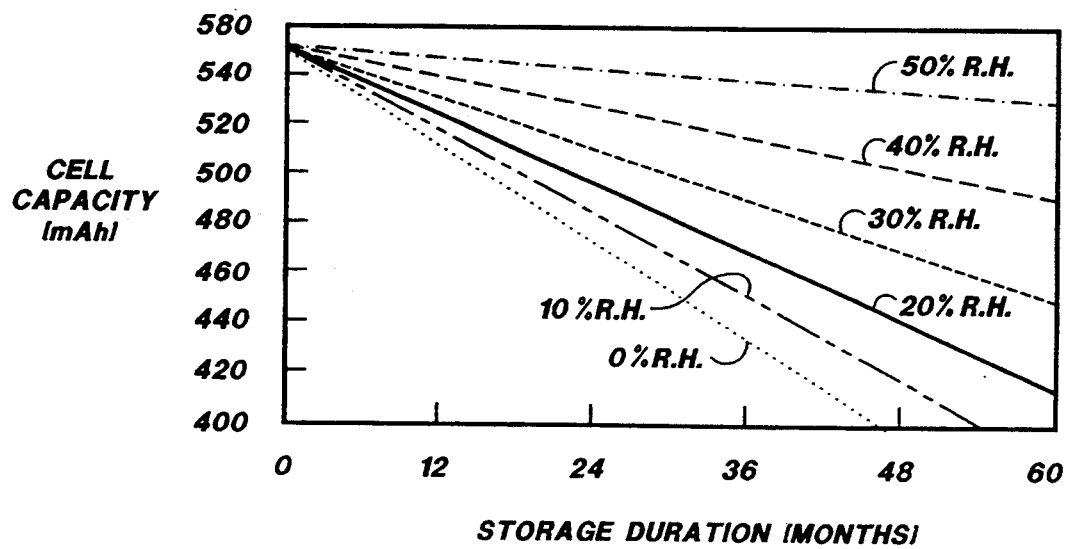
FIG. 4 shows the change in cell capacity over time of cells of the present invention as a function of selected relative humidity storage conditions.

The metal-air cells of the present invention also exhibit excellent cell capacity when stored in low humidity conditions. FIG. 4 shows moisture change versus time in a zinc air cell of the present invention for several relative humidities at 70° F. In FIG. 4, all but the heavy "20% RH" line represent theoretical data for the various indicated relative humidity conditions, where the data were calculated on the basis of the known relative humidities of the tested cell and the environment. Since relative humidity changes within the cell were not taken into consideration in the calculations corresponding to the theoretical model, the data in FIG. 4 are conservative. (Note that the heavy line in FIG. 4 labeled "20% RH" represent actual data obtained using metal-air cells of the present invention stored at 20% relative humidity for two years.)

Figure 5:
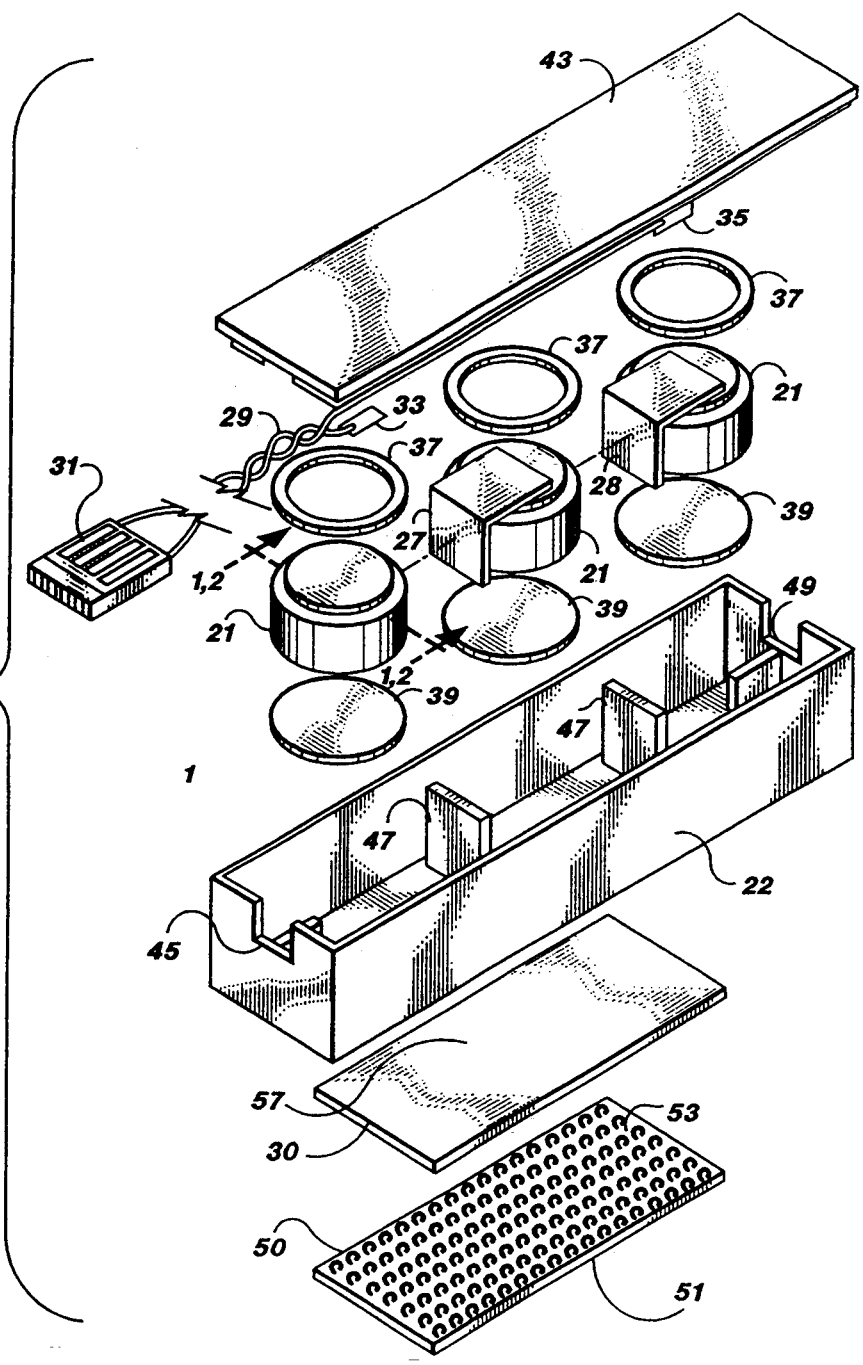
FIG. 5 shows a perspective view of a battery comprising a plurality of metal-air cells of the present invention.

FIG. 5 shows a perspective view of a battery of the present invention comprising a plurality of the metal-air cells of the present invention connected in series. The battery is particularly well adapted for low-current back-up power applications in computers, such as for providing back-up power to real time clocks and to configuration computer memory. Because of its small size, the battery is especially well adapted for use in portable computers such as laptop and notebook computers. Typically, back-up batteries for portable computers require a maximum continuous current capability of 75 $\mu$A, which the battery of the present invention can provide.

As shown in FIG. 5, a battery of the present invention may comprise three metal-air cells 21 constructed as described above, and electrically connected in series by nickel strips 27 and 28. Terminals 33 and 35 are connected to the positive and negative terminals, respectively, of the first and third metal-air cells connected in series. Lead 29 comprises two wires connected to terminals 33 and 35, and is connected to industry standard 4-pin polarized connector 31. Insulating adhesive-backed polypropylene rings 37 are placed on the upper surfaces of cells 21 to prevent electrical shorting between the battery terminals and nickel strips 27 and 28.

Metal-air cells of the present invention are placed in battery housing 22, where barrier walls 47 maintain cells 21 separate from one another within battery housing 22. Between the bottoms of cells 21 and battery housing 22 are disposed air diffusion pads 39 for absorbing electrolyte that may leak from cells 21. Air diffusion pads 39 also provide a pathway for air to the air ingress ports of cells 21, and may be composed of paper. Lead 29 is positioned through battery housing air ingress pod 45 once cells 21 are placed in the housing, thereby permitting battery housing cover 43 to be placed atop battery housing 22, and welded thereon by ultrasonic means. Battery housing air ingress pods 45 and 49 provide pathways for air to enter battery housing 22 to provide oxygen to metal-air cells 21 disposed therein.

Mounting strip 30 may be attached to the underside of battery housing 22 by adhesive means disposed on its upper surface 57. Fibrous VELCRO ® backing is disposed on the bottom surface of the mounting strip 30, and is adapted to engage and secure to VELCRO ® backing strip 50 having hook-shaped plastic strands on its upper surface 53. VELCRO ® backing strip 50 may, in turn, be attached by adhesive means disposed on its bottom surface 51 to a surface in the desired location.

Figure 6:
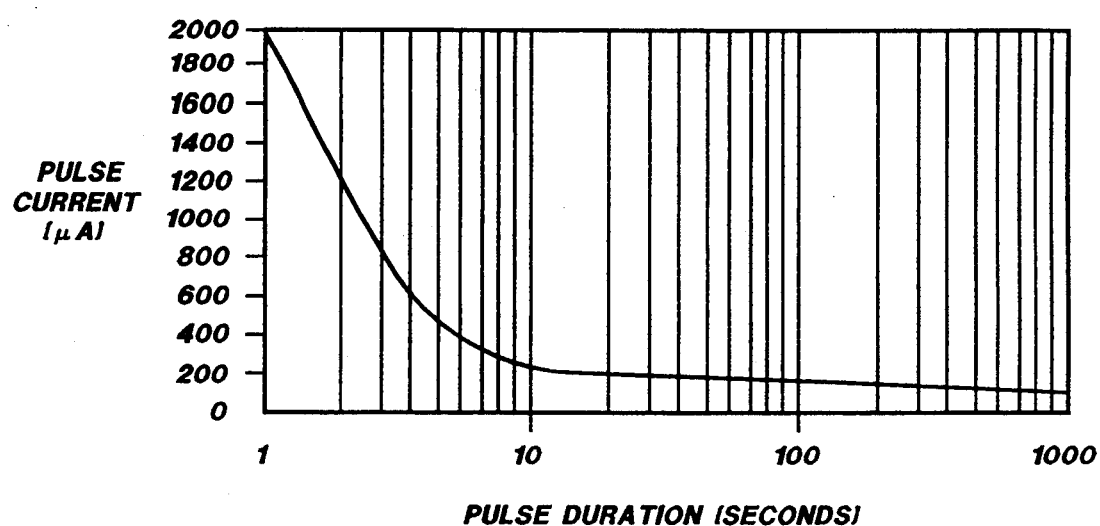
FIG. 6 shows the output pulse currents a battery of the present invention provides over different pulse durations when placed under a potentiostatic load of 3.9 Volts.

To test the pulse capability of a battery of the present invention, a battery containing cells of the present invention was placed under a potentiostatic discharge load of 3.9 Volts for an eighteen hour period. Table 1 below shows the results obtained in that test. FIG. 6 shows the same results graphically.

TABLE 1

Output Current vs. Time for a Battery Subjected to a 3.9 Volt Potentiostatic Discharge Load

| Time (sec.) | Time (min.) | Time (hrs.) | Current ($\mu$A) |
|---|---|---|---|
| 0 | 0.0 | 0.0000 | 10000 |
| 1 | 0.02 | 0.0000 | 2000 |
| 2 | 0.03 | 0.0000 | 989 |
| 3 | 0.05 | 0.0000 | 820 |
| 4 | 0.07 | 0.0000 | 640 |
| 5 | 0.08 | 0.0000 | 500 |
| 6 | 0.10 | 0.0000 | 381 |
| 7 | 0.12 | 0.0000 | 337 |
| 8 | 0.13 | 0.0000 | 302 |
| 9 | 0.15 | 0.0000 | 287 |
| 10 | 0.17 | 0.0000 | 268 |
| 11 | 0.18 | 0.0000 | 248 |
| 12 | 0.20 | 0.0000 | 230 |
| 13 | 0.22 | 0.0000 | 212 |
| 14 | 0.23 | 0.0000 | 196 |
| 15 | 0.25 | 0.0000 | 180 |
| 3600 | 60.0 | 0.0000 | 92 |
| 10800 | 180.0 | 0.0000 | 75 |
| 64800 | 1080 | 0.0000 | 61 |

Table 1 and FIG. 6 show that as time increases the current delivered by the battery decreases gradually until it asymmtotically approaches a value of about 50 $\mu$A. Fifty $\mu$A represents the amount of current the tested battery would have provided had the air reservoir of the present invention not been present in the cells of the battery. Table 1 and FIG. 6 show that the battery of the present invention provides more than 50 $\mu$A of output current over the entire duration of the eighteen-hour test, and that the battery can provide more than 100 $\mu$A of output current for almost an hour. Additionally, FIG. 6 and Table 1 show that the battery can provide 2000 $\mu$A of output current over a one-second interval, and 10,000 $\mu$A on an instantaneous basis. Thus, a metal-air battery having the air reservoir of the present invention can provide up to forty times more current on an instantaneous, intermittent basis, and up to twice as much current continuously over an hour's time, when compared to prior ad metal-air cells not having the air reservoir of the present invention.

While the present invention has been described in connection with a specific embodiment, it is understood that modifications and variations may be resorted to without departing from the spirit and scope of the invention. As those of normal skill in the art will readily appreciate, such modifications and variations, together with other equivalent embodiments, are within the purview and scope of the appended claims.

We claim:

1. A metal-air cell, comprising:
   (a) a cathode can comprising a closed first end forming a bottom, first sidewalls projecting upwardly from the bottom, and an initially open second end, the first sidewalls forming an inner surface, the can forming a positive current collector, the bottom having exterior and interior surfaces and at least one air entry port disposed therethrough, the port providing an air pathway between the exterior and interior surfaces of the bottom of the cathode can;
   (b) an anode can comprising a closed first end forming a top, second sidewalls projecting downwardly from the top, and an initially open second end, the second sidewalls forming an outer surface, the anode can forming a negative current collector, the anode can fitting within the cathode can such that the anode can top and the cathode can bottom form the top and the bottom of the metal-air cell;

(c) a grommet disposed between at least a portion of the inner surface of the first sidewalls and at least a portion of the outer surface of the second sidewalls;

(d) a metal anode disposed within the anode can;

(e) an air cathode assembly having top and bottom major opposing surfaces, the air cathode assembly being disposed inside the cathode can and interposed between the metal anode and the interior surface of the bottom of the cathode can, the top surface of the air cathode assembly being in contact with the metal anode;

(f) a restrictive membrane having top and bottom major opposing sides, the membrane being interposed between the bottom surface of the air cathode assembly and the interior surface of the bottom of the cathode can, the membrane forming a continuous and uninterrupted sheet extending across and covering substantially all of the interior surface of the bottom of the cathode can, the bottom of the cathode can effectively supporting the restrictive membrane, and (g) an air reservoir disposed between the bottom surface of the air cathode assembly and the restrictive membrane, the air reservoir providing sufficient oxygen to the air cathode assembly for periods of high current drain upon the cell.

2. The metal-air cell of claim 1, wherein the restrictive membrane comprises polytetrafluoroethylene.

3. The metal-air cell of claim 1, wherein the restrictive membrane is about 0.0005 inches thick.

4. The metal-air cell of claim 1, wherein the air reservoir is further defined by a spacer interposed between the restrictive membrane and the air cathode assembly.

5. The metal-air cell of claim 1, wherein the interior surface of the cathode can has embossed thereupon a diffusion grid.

6. The metal-air cell of claim 1, wherein a porous air-entrapping material fills the air reservoir.

7. The metal-air cell of claim 1, wherein the metal-air cell contains a single air reservoir interposed between the bottom surface of the air cathode assembly and the interior surface of the cathode can.

8. A battery comprising a plurality of metal-air cells connected in series, each metal-air cell comprising:

(a) a cathode can comprising a closed first end forming a bottom, first sidewalls projecting upwardly from the bottom, and an initially open second end, the first sidewalls forming an inner surface, the can forming a positive current collector, the bottom having exterior and interior surfaces and at least one air entry port disposed therethrough, the port providing an air pathway between the exterior and interior surfaces of the bottom of the cathode can;

(b) an anode can comprising a closed first end forming a top, second sidewalls projecting downwardly from the top, and an initially open second end, the second sidewalls forming an outer surface, the anode can forming a negative current collector, the anode can fitting within the cathode can such that the anode can top and the cathode can bottom form the top and the bottom of the metal-air cell;

(c) a grommet disposed between at least a portion of the inner surface of the first sidewalls and at least a portion of the outer surface of the second sidewalls;

(d) a metal anode disposed within the anode can;

(e) an air cathode assembly having top and bottom major opposing surfaces, the air cathode assembly being disposed inside the cathode can and interposed between the metal anode and the interior surface of the bottom of the cathode can, the top surface of the air cathode assembly being in contact with the metal anode;

(f) a restrictive membrane having top and bottom major opposing sides, the membrane being interposed between the bottom surface of the air cathode assembly and the interior surface of the bottom of the cathode can, the membrane forming a continuous and uninterrupted sheet extending across and covering substantially all of the interior surface of the bottom of the cathode can, the bottom of the cathode can effectively supporting the restrictive membrane, arid (g) an air reservoir disposed between the bottom surface of the air cathode assembly and the top side of the restrictive membrane, the air reservoir providing sufficient oxygen to the air cathode assembly for periods of high current drain upon the cell.

9. The battery of claim 8, wherein the plurality of metal-air cells is disposed within a sealed battery housing having at least one battery housing air ingress port disposed therethrough.

10. The battery of claim 9, wherein the battery housing has a mounting strip disposed on its exterior surface.

11. The battery of claim 9, wherein three metal-air cells are connected in series and disposed within the battery housing.

12. The battery of claim 9, wherein air diffusion pads are interposed between the battery housing and the bottoms of the metal-air cells.

13. The battery of claim 9, wherein insulative rings are positioned on the tops of the metal air cells to prevent electrical shorting between the positive and negative terminals thereof.

14. The battery of claim 8, wherein conductive metal strips electrically connect the metal-air cells in series.

15. The battery of claim 9, wherein an electrical lead having two wires is connected at its first end to the opposing terminals of the metal-air cells connected in series, and delivers electrical current generated by the metal-air cells through a connector positioned at its second end.

16. The battery of claim 9, wherein the at least one battery housing air ingress port has a restrictive membrane disposed thereacross for controlling the rate of ingress of oxygen into the battery housing.

17. The battery of claim 8, wherein the plurality of metal-air cells is three metal-air cells.

18. The battery of claim 8, wherein the restrictive membranes of the metal-air cells comprise polytetrafluoroethylene.

19. The battery of claim 8, wherein the restrictive membranes of the metal air cells are about 0.0005 inches thick.

20. The battery of claim 8, wherein the air reservoir of each metal-air cell is further defined by a spacer disposed between the restrictive membrane and the air cathode assembly.

21. The battery of claim 8, wherein a porous air-entrapping material fills the air reservoirs of the metal-air cells.

22. The metal-air cell of claim 1, wherein each metal-air cell contains a single air reservoir interposed between the bottom surface of the air cathode assembly and the interior surface of the cathode can.

23. A metal-air cell, comprising:
   (a) a cathode can comprising a closed first end forming a bottom, first sidewalls projecting upwardly from the bottom, and an initially open second end, the first sidewalls forming an inner surface, the can forming a positive current collector, the bottom having exterior and interior surfaces and at least one air entry port disposed therethrough, the port providing an air pathway between the exterior and interior surfaces of the bottom of the cathode can;
   (b) an anode can comprising a closed first end forming a top, second sidewalls projecting downwardly from the top, and an initially open second end, the second sidewalls forming an outer surface, the anode can forming a negative current collector, the anode can fitting within the cathode can such that the anode can top and the cathode can bottom form the top and the bottom of the metal-air cell;
   (c) a grommet disposed between at least a portion of the inner surface of the first sidewalls and at least a portion of the outer surface of the second sidewalls;
   (d) metal anode disposed within the anode can;
   (e) an air cathode assembly having top and bottom major opposing surfaces, the air cathode assembly being disposed inside the cathode can and interposed between the metal anode and the interior surface of the bottom of the cathode can, the top surface of the air cathode assembly being in contact with the metal anode;
   (f) a restrictive membrane having top and bottom major opposing sides, the membrane being interposed between the bottom surface of the air cathode assembly and the interior surface of the bottom of the cathode can, the membrane forming a continuous and uninterrupted sheet extending across and covering substantially all of the interior surface of the bottom of the cathode can, the bottom of the cathode can effectively supporting the restrictive membrane, and
   (g) an air reservoir disposed between the bottom surface of the air cathode assembly and the restrictive membrane, the air reservoir providing sufficient oxygen to the air cathode assembly for periods of high current drain upon the cell, the rate of air flow between the cell exterior and the air reservoir being controlled at all times by the restrictive membrane.

24. A metal-air cell, comprising:
   a cathode can comprising a closed first end forming a bottom, first sidewalls projecting upwardly from the bottom, and an initially open second end, the first sidewalls forming an inner surface, the can forming a positive current collector, the bottom having exterior and interior surfaces and at least one air entry port disposed therethrough, the port providing an air pathway between the exterior and interior surfaces of the bottom of the cathode can;
   (b) an anode can comprising a closed first end forming a top, second sidewalls projecting downwardly from the top, and an initially open second end, the second sidewalls forming an outer surface, the anode can forming a negative current collector, the anode can fitting within the cathode can such that the anode can top and the cathode can bottom form the top and the bottom of the metal-air cell;
   (c) a grommet disposed between at least a portion of the inner surface of the first sidewalls and at least a portion of the outer surface of the second sidewalls;
   (d) metal anode disposed within the anode can;
   (e) an air cathode assembly having top and bottom major opposing surfaces, the air cathode assembly being disposed inside the cathode can and interposed between the metal anode and the interior surface of the bottom of the cathode can, the top surface of the air cathode assembly being in contact with the metal anode;
   (f) a restrictive membrane having top and bottom major opposing sides, the membrane being interposed between the bottom surface of the air cathode assembly and the interior surface of the bottom of the cathode can, the membrane forming a continuous and uninterrupted sheet extending across and covering substantially all of the interior surface of the bottom of the cathode can, the bottom of the cathode can effectively supporting the restrictive membrane, and
   (g) an air reservoir disposed between the bottom surface of the air cathode assembly and the restrictive membrane, the air reservoir providing sufficient oxygen to the air cathode assembly to permit a current drain of at least of 500 $\mu$A to be made upon the cell for a duration of at least 20 seconds.

* * * * *